United States Patent [19]

Savard

[11] Patent Number: 5,186,214

[45] Date of Patent: Feb. 16, 1993

[54] TEMPORARY DISINTEGRATABLE PLUG FOR AN OPEN-ENDED OIL PIPELINE

[75] Inventor: Donald D. Savard, Edmonton, Canada

[73] Assignee: Interprovincial Pipe Line Company, Edmonton, Canada

[21] Appl. No.: 549,850

[22] Filed: Jul. 9, 1990

[51] Int. Cl.$^5$ ............................................. F16L 55/04
[52] U.S. Cl. ...................................... 138/89; 138/97; 228/119
[58] Field of Search ................... 138/89, 90, 93, 97; 228/119; 166/317, 192; 137/67, 467.5, 624.27, 797, 800

[56] References Cited

U.S. PATENT DOCUMENTS

| | | | |
|---|---|---|---|
| 2,175,137 | 10/1939 | Summers | 138/93 |
| 3,338,499 | 8/1967 | Gilbert | 138/89 |
| 3,962,767 | 6/1976 | Byerley | 138/97 |
| 4,357,960 | 11/1982 | Han | 138/89 |
| 4,379,722 | 4/1983 | Scott | 138/89 |
| 4,383,783 | 5/1983 | Kruka et al. | 138/89 |
| 4,607,664 | 8/1986 | Carney et al. | 138/89 |
| 4,634,040 | 1/1987 | Savard | 228/119 |
| 4,739,799 | 4/1988 | Carney et al. | 138/89 |
| 4,754,775 | 7/1988 | Ollerenshaw | 138/89 |

Primary Examiner—James E. Bryant, III
Attorney, Agent, or Firm—Millen, White, Zelano and Branigan

[57] ABSTRACT

The plug is formed of fibrous material held together by a wax binder in the form of a cylindrical body. The body is adapted to fit closely into the bore of an open-ended pipeline. The body has a reduced diameter inner end portion. A thick band of asphalt-base sealant is applied to the inner surface of the pipe at the location to be taken up by the reduced diameter portion. The vertical inner end surface of the plug is also coated with the sealant. When the plug is inserted into the line, its close fit holds it in place and the sealant seals across the bore. The plug functions to isolate residual hydrocarbon vapors in the line while a new section of pipe is tied in. The plug disintegrates when contacted with the subsequent oil flow.

2 Claims, 1 Drawing Sheet

TEMPORARY DISINTEGRATABLE PLUG FOR AN OPEN-ENDED OIL PIPELINE

FIELD OF THE INVENTION

The present invention relates to a disintegratable plug for temporarily sealing the open end of a steel pipeline containing hydrocarbon vapours, so that welding and the like can safely be carried out at the pipe end.

The invention further relates to a method for temporarily sealing the open-ended bore of a pipeline with a solid unitary cylindrical plug, to isolate vapours in the line so that they cannot mix with air, adding a new section of pipe to the line, and then disintegrating the plug with liquid hydrocarbons pumped through the line.

BACKGROUND OF THE INVENTION

With respect to a steel pipeline for conveying liquid hydrocarbons, it is a common requirement to have to extend the pipeline or to replace a defective section of it. These two operations are hereafter generically referred to herein as adding a section of pipe to the line.

In the particular case of replacing a section of defective pipe, one firstly drains liquid hydrocarbons from the section of the line to be worked on and then cuts or severs the line at the two ends of the section. Cutting can be carried out without danger using an explosion-proof cutting tool, specifically designed to operate in this environment.

In both cases, one is now at the point where the line is open-ended, hydrocarbon vapours are present in the line bore, and air may enter the bore.

To add a section of pipe will normally entail butt-welding.

There is therefore a need to seal the open end(s) of the line to isolate the hydrocarbon vapours and permit the addition of the new pipe section to go forward.

In commercial practice in the past, this has usually been accomplished by stuffing the open pipe end with a plug of particulate aquagel or similar material. After the new pipe section has been added, the plug is disintegrated by pumping it down the line using liquid hydrocarbon. The powder-like aquagel becomes dispersed and entrained in the flow. The aquagel particles are minute and do not damage pumps in the line. The concentration of particles in the liquid is so small that they essentially become inconsequential.

However the aquagel plugs have proven to be unreliable with respect to sealing off the hydrocarbon vapours. The plug can slump and/or move, allowing vapours to escape past it. The gas combined with the air trapped in the new section can result in an explosive mixture, which can be ignited by the welding process. In addition, the installation of the aquagel plug is a time-consuming process.

It is the objective of this invention to provide a new form of disintegratable plug for use in this service.

Turning now to prior art of interest known to applicant, reference is made to my U.S. Pat. No. 4,634,040. This patent teaches internally insulating a pipeline wall, that is to undergo a fillet weld, with a ring formed of fibrous material held together with a wax binder. The ring functions to prevent heat being conveyed away at too rapid a rate into liquid present in the pipe bore; such rapid heat loss can lead to development of a brittle weld. Upon completion of welding, the ring is disintegrated by flowing oil past it to dissolve the wax to leave the fibers, which can be pumped down the line without difficulty and, like the gel, become inconsequential.

SUMMARY OF THE INVENTION

In accordance with the present invention, a solid unitary cylindrical plug is emplaced in the open end of a pipeline, to function as a temporary vapour barrier. The plug is impermeable to vapours. It is adapted to disintegrate when contacted by liquid hydrocarbons and become inconsequential to the proper operation of the line.

More particularly, the plug comprises a full diameter, hollow body adapted to have a close fit with the inside surface of the line. At its inner end, the body has a reduced diameter portion. The vertical end surface of this portion is preferably coated with an adhesive sealant that is impermeable to hydrocarbon vapours and is slowly soluble in liquid hydrocarbon. Before the cylinder is inserted into the pipe end, a thick annular band of adhesive, vapour-impermeable sealant, which preferably will dissolve slowly in liquid hydrocarbon, is applied to the inside surface of the line at the point where the cylinder inner end is to be positioned. When the cylinder is inserted, the layer of sealant packs closely around the reduced diameter portion to effectively seal the junction of the main body and the inner surface of the line. The cylinder body is formed of a fibrous material held together in cylinder form by a hydrocarbon-soluble binder, such as wax.

In use, the sealant band is applied and the cylinder is inserted into the open pipe end, to form a vapour barrier. The new section of pipe is added by butt-welding it in place. Liquid hydrocarbon is then re-introduced into the line to dissolve the sealant and binder and thereby disintegrate the cylinder into a fibrous mass that can be pumped and dispersed into a harmless or inconsequential state. Use of the plug minimizes installation time and the risk of explosion to the installation crew.

The invention has been described in the context of a single plug and pipe end. It is self-evident that, in the case of replacing a defective section of pipe, two plugs and pipe ends will be involved.

DESCRIPTION OF THE PREFERRED EMBODIMENT

Figure 1:
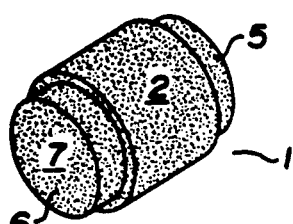
FIG. 1 is a perspective view showing a plug in accordance with the invention
Figure 2:
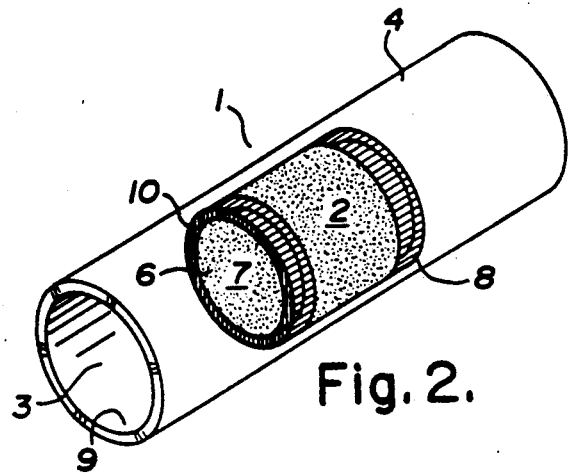
FIG. 2 is a perspective view showing the plug sealed with sealant in an open-ended pipeline, functioning as a vapour seal.
Figure 3:
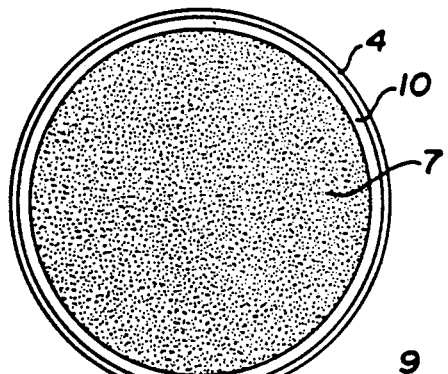
FIG. 3 is an end view of the sealed plug in the pipeline, taken along the line B--B of FIG. 2.
Figure 4:
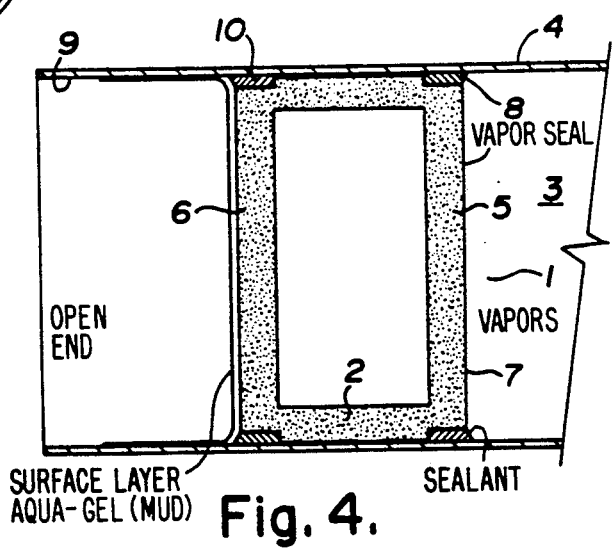
FIG. 4 is a side sectional view showing the plug sealed in a pipeline by a combination of sealant and gel.

The plug 1 comprises a hollow cylindrical main body 2 of sufficiently close fit in the bore 3 of the line 4 to be sealed, so as to maintain its position when emplaced therein.

A pair of inner and outer end discs 5,6 of reduced diameter are secured by oil-soluble adhesive to the and faces of the main body 2.

The vertical end faces 7 of the discs 5,6 are precoated with an asphalt-base sealant which is impermeable to gas and is soluble in oil.

In use, a first annular band or layer 8 of adhesive, oil-soluble, gas-impermeable sealant is applied to the inside surface 9 of the line 4 at the position to be occupied by the inner end of the plug 1. The plug 1 is then inserted with the result that the sealant layer 8 seals between the pipe surface 9 and the outer surface of the inner disc 5. A second band 10 of the sealant is then packed in to the annular space between the outer disc 6 and the pipe surface 9. The plug 1 is now effectively a temporary vapour barrier that will seal the pipe bore 3 and allow welding to be carried out.

When the new section of pipe has been added, the plug(s) 1 can be pumped down the line with oil and they will slowly break up and disintegrate.

Example 1 describes the specific steps and materials that have been used to produce the preferred form of the plug.

EXAMPLE 1

An emulsion formed of 8 parts water and part cellulosic fibre (marketed by Can Cel Ltd. under the mark Celib) was placed in a drum having a perforated side wall. The drum was spun at sufficient rpm to remove the water and plaster the fibre against the drum wall to form a cylinder. A liquid paraffin wax emulsion was then added to the spinning drum contents. The wax also tends to move through the fibre and be discharged through the drum perforations. However, sufficient wax remained associated with the fibre (following the evaporation of the water) to form it into a strong, cohesive, unitary cylindrical body.

The end discs were formed by pressing the same slurry in a die and then forcing wax through the disc to create the binder.

The discs were attached to the body with an adhesive sold under the designation #425 by Elsro Asphalt Ltd. of St. Albert, Alberta.

An asphalt-base sealant, sold under the designation "450" and available from Elsro Asphalt Ltd., was used to coat the end face of each disc and to provide the annular layers in the pipe.

The dimensions of the plug were as follows:
outside diameter of main body—19"
inside diameter of main body—15"
diameter of end discs—17.5"
thickness of end discs—2"

A test assembly was provided. It comprised a $20'' \times 0.375'' \times 2$ meter long section of pipe. The steel pipe was capped at one end and had a 2" inlet port. A $2''\pi$ wide $\times \frac{3}{4}''$ thick band of sealant was applied to the inside surface of the pipe at the expected location of the inner disc of the plug.

The plug was inserted and positioned 0.6 meters into the pipe. A charge of diesel fuel (6" in depth) was pumped into the pipe bore between the plug and the end cap.

Monitoring, using electronic vapour detection equipment, was continued for 4 days at the open end of the pipe for a visual leak of diesel fuel past the plug and for the presence of gas vapours. None was detected.

The embodiments of the invention in which an exclusive property or privilege is claimed are defined as follows:

1. In combination:
   an open-ended steel pipeline having an inner surface forming a bore containing hydrocarbon vapours;
   a cylindrical plug sealing the bore of the pipeline, said plug being formed of fibrous material held together with oil-soluble binder and comprising a main body having a close fit with the inner surface of the pipeline, said pug having a reduced diameter inner end portion which is gas impermeable, said plug being disintegratable when pumped and contacted with liquid hydrocarbon; and
   a bank of gas-impermeable oil-soluble sealant adhering to the pipeline inner surface and sealing between the reduced diameter portion of the plug and the inner surface of the pipeline.

2. The combination as set forth in claim 1 wherein:
   the reduced diameter inner end portion has an end face coated with a gas-impermeable oil-soluble sealant;
   the plug has a reduced diameter outer end portion having an end face coated with a gas-impermeable oil-soluble sealant; and
   a second band of gas-impermeable oil-soluble sealant adheres to the pipeline inner surface and seals between the outer end portion and the inner surface of the pipeline.

* * * * *